United States Patent
Lee et al.

(10) Patent No.: US 8,709,653 B2
(45) Date of Patent: Apr. 29, 2014

(54) NEGATIVE ACTIVE MATERIAL FOR A RECHARGEABLE LITHIUM BATTERY, A METHOD OF PREPARING THE SAME, AND A RECHARGEABLE LITHIUM BATTERY COMPRISING THE SAME

(75) Inventors: Sang-Min Lee, Suwon-si (KR); Goo-Jin Jeong, Suwon-si (KR); Sung-Soo Kim, Suwon-si (KR); Yoshiaki Nitta, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1260 days.

(21) Appl. No.: 11/077,377

(22) Filed: Mar. 8, 2005

(65) Prior Publication Data

US 2005/0233213 A1  Oct. 20, 2005

(30) Foreign Application Priority Data

Mar. 8, 2004 (KR) .................. 10-2004-0015478
Mar. 8, 2004 (KR) .................. 10-2004-0015479

(51) Int. Cl.
*H01M 4/13* (2010.01)
*H01M 4/02* (2006.01)

(52) U.S. Cl.
USPC ................................ 429/218.1; 429/209

(58) Field of Classification Search
USPC ............................................. 429/209, 218.1
See application file for complete search history.

(56) References Cited

U.S. PATENT DOCUMENTS

| | | | |
|---|---|---|---|
| 4,410,607 A | 10/1983 | Arons et al. | |
| 5,080,963 A | 1/1992 | Tatarchuk et al. | |
| 5,531,943 A | 7/1996 | Sudani et al. | |
| 5,888,430 A | 3/1999 | Wakayama | |
| 6,432,579 B1 | 8/2002 | Tsuji et al. | |
| 6,558,841 B1 | 5/2003 | Nakagiri et al. | |
| 6,638,662 B2 * | 10/2003 | Kaneda et al. | 429/231.8 |
| 2002/0168574 A1 | 11/2002 | Ahn et al. | |
| 2003/0008212 A1 * | 1/2003 | Akashi et al. | 429/231.9 |
| 2003/0053945 A1 * | 3/2003 | Fukuoka et al. | 423/332 |
| 2003/0129497 A1 * | 7/2003 | Yamamoto et al. | 429/246 |
| 2004/0033419 A1 * | 2/2004 | Funabiki | 429/218.1 |
| 2004/0121236 A1 | 6/2004 | Shen et al. | |
| 2005/0058589 A1 | 3/2005 | Lundquist et al. | |
| 2005/0118500 A1 * | 6/2005 | Yata et al. | 429/162 |

(Continued)

FOREIGN PATENT DOCUMENTS

| | | |
|---|---|---|
| CN | 1265232 A | 8/2000 |
| CN | 1428880 A | 7/2003 |

(Continued)

OTHER PUBLICATIONS

Patent Abstracts of Japan, Publication No. 2000-243395, dated Sep. 8, 2000, in the name of Hiroya Yamashita et al.

(Continued)

*Primary Examiner* — Helen O Conley
(74) *Attorney, Agent, or Firm* — Christie, Parker & Hale, LLP

(57) ABSTRACT

The present invention relates to a negative active material for a rechargeable lithium battery, which includes a silicon-based composite having a silicon oxide of the form $SiO_x$ where $x \leq 1.5$ and at least one element selected from the group consisting of B, P, Li, Ge, Al, and V, and a carbonaceous material. The negative active material of the present invention can improve the cycle-life and high-rate charge/discharge characteristics of a rechargeable lithium battery.

11 Claims, 4 Drawing Sheets

(56) References Cited

U.S. PATENT DOCUMENTS

| | | |
|---|---|---|
| 2005/0233213 A1 | 10/2005 | Lee et al. |
| 2006/0018822 A1 | 1/2006 | Okamoto |
| 2006/0087799 A1 | 4/2006 | Kosuda et al. |
| 2006/0166098 A1 | 7/2006 | Tabuchi et al. |
| 2007/0258879 A1 | 11/2007 | Karles et al. |

FOREIGN PATENT DOCUMENTS

| | | | |
|---|---|---|---|
| CN | 1507092 | A | 6/2004 |
| CN | 1559092 | A | 12/2004 |
| CN | 1567617 | A | 1/2005 |
| JP | 1994-318454 | | 11/1994 |
| JP | 1997-249407 | | 9/1997 |
| JP | 11-273675 | A | 10/1999 |
| JP | 2000-243395 | | 9/2000 |
| JP | 2001-196065 | | 7/2001 |
| JP | 2001-283848 | | 10/2001 |
| JP | 2002-042806 | A | 2/2002 |
| JP | 2002-201360 | | 7/2002 |
| JP | 2002-260637 | | 9/2002 |
| JP | 2002-260651 | A | 9/2002 |
| JP | 2002-373653 | A | 12/2002 |
| JP | 2003-160328 | A | 6/2003 |
| JP | 2003-192327 | A | 7/2003 |
| JP | 2003-197191 | A | 7/2003 |
| JP | 2003-346803 | | 12/2003 |
| JP | 2004-158205 | | 6/2004 |
| JP | 2005-093984 | | 4/2005 |
| JP | 2005-123175 | | 5/2005 |
| JP | 2005-135925 | | 5/2005 |
| JP | 2005-158721 | | 6/2005 |
| JP | 2006-036576 | | 2/2006 |
| KR | 10-1998-0023035 | | 7/1998 |
| KR | 2001-0105622 | | 11/2001 |
| KR | 10-2004-0096276 | | 11/2004 |
| KR | 10-2006-0024325 | | 3/2006 |
| WO | WO 99/00001 | A3 | 1/1999 |
| WO | WO 03/096449 | A1 | 11/2003 |

OTHER PUBLICATIONS

Chinese Patent Publication dated Oct. 7, 2009, for corresponding Chinese application 200510064093.5.
Japanese Office action dated May 29, 2012, for Japanese Patent application 2007-058912, (2 pages).
Patent Abstracts of Japan, and English machine translation of Japanese Publication 2005-135925 listed above, (46 pages).
Patent Abstracts of Japan, and English machine translation of Japanese Publication 2005-158721 listed above, (45 pages).
Barrett, E. P. et al., *The Determination of Pore Volume and Area Distributions in Porous Substances. I. Computations from Nitrogen Isotherms*, Journal of Am. Chem Society., (1951) vol. 73, pp. 373-380.
SIPO Registration Determination Certificate dated May 19, 2010, for Chinese Patent application 200710001650.8.
English machine translation of Japanese Publication 06-318454, listed above, pages.
U.S. Office action dated Jul. 21, 2009, for cross reference U.S. Appl. No. 11/689,941.
U.S. Office action dated Dec. 11, 2009, for cross reference U.S. Appl. No. 11/689,941.
U.S. Office action dated Jan. 31, 2011, for cross reference U.S. Appl. No. 11/829,787.
KIPO Notice of Allowance dated Feb. 12, 2008, for Korean Patent application 10-2006-0130375, 4 pages.
Patent Abstracts of Japan, and English machine translation of Japanese Publication 2002-201360, listed above, 41 pages.
U.S. Office action dated Apr. 26, 2011, for cross reference U.S. Appl. No. 11/689,941, pp. 17 pages.
U.S. Notice of Allowance dated Jul. 22, 2011, for cross reference U.S. Appl. No. 11/829,787, 11 pages.
U.S. Office action dated Aug. 23, 2011, for cross reference U.S. Appl. No. 11/689,941, 12 pages.
Chen, W, et al., *Electrochemical Insertion/extraction of Lithium in Multiwall Carbon Nanotube/Sb and $SnSb_{0.5}$ Nanocomposites*, DSpace@MIT, Molecular Engineering of Biologican and Chemical Systems (2003), 6 pages.
KIPO Office action dated Jan. 14, 2013, for Korean Patent application 10-2006-0034671, ) (6 pages).
Patent Abstracts of Japan, and English machine translation for Japanese Publication 2005-123175 listed above, (37 pages).
KIPO Notice of Allowance dated Oct. 8, 2013, for Korean Patent application 10-2006-0034671, (6 pages).

\* cited by examiner

NEGATIVE ACTIVE MATERIAL FOR A RECHARGEABLE LITHIUM BATTERY, A METHOD OF PREPARING THE SAME, AND A RECHARGEABLE LITHIUM BATTERY COMPRISING THE SAME

CROSS REFERENCES TO RELATED APPLICATION

This application claims priority to and the benefit of Korean Patent Application Nos. 10-2004-0015478, and 10-2004-0015479, both filed on Mar. 8, 2004, both of which are hereby incorporated by reference for all purposes as if fully set forth herein.

FIELD OF THE INVENTION

The present invention relates to a negative active material for a rechargeable lithium battery, a method of preparing the same, and a rechargeable lithium battery comprising the same, and more particularly, to a negative active material for a rechargeable lithium battery having good cycle-life characteristics and good charge/discharge characteristics at a high rate, a method of preparing the same, and a rechargeable lithium battery comprising the same.

BACKGROUND OF THE INVENTION

The use of portable electronic instruments is increasing as electronic equipment gets smaller and lighter due to developments in the high-tech electronic industries. Studies on rechargeable lithium batteries are actively being pursued in accordance with an increased need for batteries having high energy density for use as power sources in these portable electronic instruments. Even though graphite is suggested for the negative active material for such batteries as it has a theoretical capacity of 372 mAh/g, a material with a higher capacity than graphite is desired.

Silicon or silicone compounds have been proposed as a substitute for graphite. The silicon or silicone compounds can be alloyed with lithium and have a higher electric capacity than graphite.

Recently, the following have been proposed as substitutes for conventional graphite material: (a) a simple mixture of graphite and a silicone compound powder; (b) a material in which a pulverized silicone compound is chemically fixed on the surface of graphite by a silane coupling agent; and (c) a material in which an element such as Si is bound with or coated on a graphite-based carbonaceous material.

However, regarding (a) a simple mixture of graphite and a silicone compound powder, the graphite is not completely contacted with the silicone compound so that the silicone compound is released from the graphite when the graphite is expanded or contracted upon repeating the charge and discharge cycles. Therefore, as the silicone compound has low electro-conductivity, the silicone compound is insufficiently utilized for a negative active material and the cycle characteristics of the rechargeable lithium battery deteriorate.

Regarding (b) a material in which a pulverized silicone compound is chemically fixed on the surface of graphite by a silane coupling agent, although the resulting material works as a negative active material, at the early charge and discharge cycles, problems arise in that the silicone compound expands when it is alloyed with the lithium upon repeating the charge and discharge cycles. Therefore, the linkage of the silane coupling agent is broken, releasing the silicone compound from the graphite so that the silicone compound is insufficiently utilized as a negative active material. As a result, the cycle characteristics of the rechargeable lithium battery deteriorate. Further, the silane coupling agent may not be uniformly treated upon preparing the negative electrode material so that it is difficult to provide a negative electrode material having a constant quality.

Regarding (c) a material in which an element such as Si is bound with or coated on the graphite-based carbonaceous material, such a material has similar problems as those of (b) a material in which the pulverized silicone compound is chemically fixed on the surface of graphite by a silane coupling agent. That is, upon progressing through charge and discharge cycles, the linkage of the amorphous carbonaceous material can be broken by the expansion of the material alloyed with the lithium. The material is thereby released from the graphite carbonaceous material and is insufficiently utilized as a negative active material. As a result, the cycle characteristics deteriorate.

SUMMARY OF THE INVENTION

In embodiments of the present invention, a negative active material is provided for a rechargeable lithium battery having improved cycle-life characteristics and charge and discharge characteristics at a high rate, as well as a method of preparing the same.

In another embodiment of the present invention, a rechargeable lithium battery is provided comprising a negative active material.

In one embodiment of the present invention, a negative active material is provided for a rechargeable lithium battery which comprises a carbonaceous material, and a silicon-based composite which comprises a silicon oxide of the form $SiO_X$ where $x \leq 1.5$, and one or more elements selected from the group consisting of B, P, Li, Ge, Al, and V.

A method of preparing the negative active material for a rechargeable lithium battery is also provided, the method comprising the steps of: mixing at least one chemical compound selected from the group consisting of B-containing compounds, P-containing compounds, Li-containing compounds, Ge-containing compounds, Al-containing compounds, and V-containing compounds with $SiO_2$ and Si to thereby produce a mixture; heat treating the mixture to prepare a silicon-based composite comprising silicon oxide of the form $SiO_X$ where $x \leq 1.5$, and one or more elements selected from the group consisting of B, P, Li, Ge, Al, and V; quenching the silicon-based composite; and coating the silicon-based composite with a carbonaceous material.

Another method of preparing the negative active material for a rechargeable lithium battery is also provided, the method comprising the steps of: mixing at least one chemical compound selected from the group consisting of B-containing compounds, P-containing compounds, Li-containing compounds, Ge-containing compounds, Al-containing compounds, and V-containing compounds, with $SiO_2$ and Si to thereby produce a mixture; heat treating the mixture to prepare a silicon-based composite comprising a silicon oxide of the form $SiO_X$ where $x \leq 1.5$, and one or more elements selected from the group consisting of B, P, Li, Ge, Al, and V; and mixing the silicon-based composite with a carbonaceous material.

In another embodiment of the present invention, a rechargeable lithium battery is provided comprising a negative electrode comprising a negative active material as described above; a positive electrode a positive active material capable of reversibly intercalating/deintercalating the lithium; and an electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

In the following detailed description, certain embodiments of the invention have been shown and described, simply by way of illustration of different modes of carrying out the invention. As will be realized, the invention is capable of modification in various obvious respects, all without departing from the scope of the invention. Accordingly, the drawings and description are to be regarded as illustrative in nature, and not restrictive.

A negative active material of the present invention comprises a carbonaceous material, and a silicon-based composite comprising a silicon oxide of the form $SiO_X$ where $x \leq 1.5$, and at least one element selected from the group consisting of B, P, Li, Ge, Al, and V.

According to a first embodiment of the present invention, a negative active material comprises a core of a silicon-based composite comprising a silicon oxide compound of the form $SiO_X$ where $x \leq 1.5$, and at least one element selected from the group consisting of B, P, Li, Ge, Al, and V. For this embodiment, a carbonaceous material is coated on the surface of the core.

Figure 1:
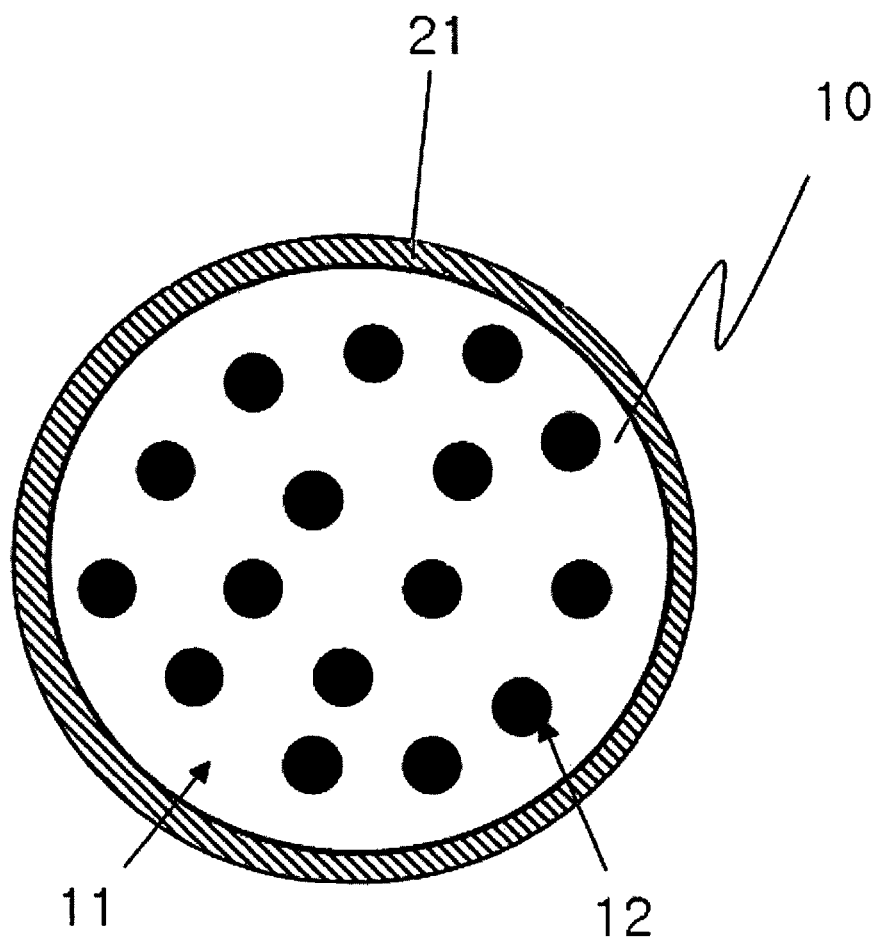
FIG. 1 is a cross-sectional view showing a negative active material with a silicon-based composite coated with a carbonaceous material in accordance with a first embodiment of the present invention.

FIG. 1 is a cross-sectional view showing a negative active material for a rechargeable lithium battery in which a core of silicon-based composite is coated with a carbonaceous material in accordance with the first embodiment of the present invention. As shown in FIG. 1, the negative active material has a structure with a core material 10, which is formed of nano-crystalline silicon 12 dispersed in the silicon-based composite 11 that includes silicon oxide of the form $SiO_X$ where $x \leq 1.5$, and at least one element selected from the group consisting of B, P, Li, Ge, Al, and V, wherein the core is coated with a carbonaceous material 21.

According to a second embodiment of the present invention, a negative active material includes a mixture of a carbonaceous material and a silicon-based composite comprising silicon oxide of the form $SiO_X$ where $x \leq 1.5$, and at least one element selected from the group consisting of B, P, Li, Ge, Al, and V.

Figure 2:
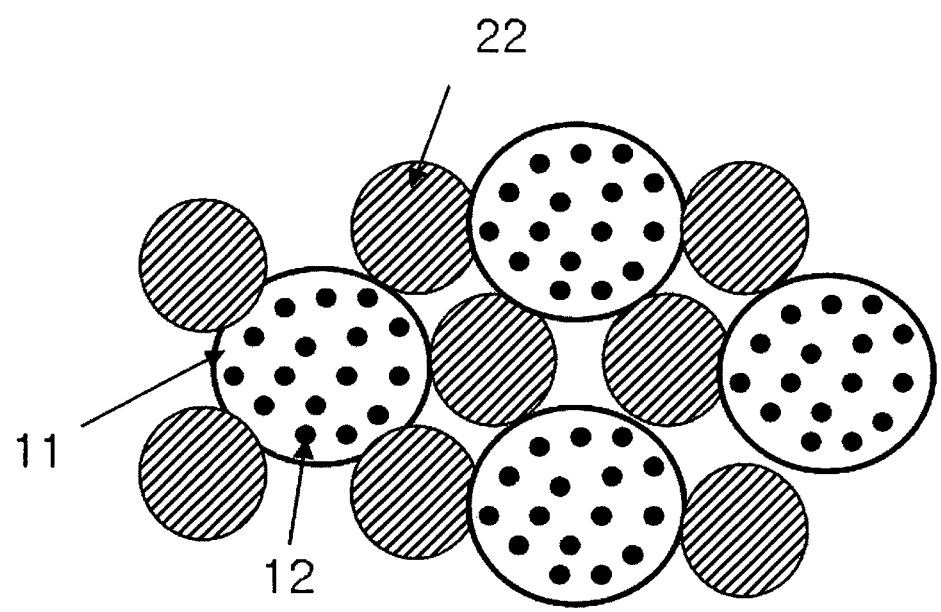
FIG. 2 is a cross-sectional view showing a negative active material with a mixture of a carbonaceous material and a silicon-based composite in accordance with a second embodiment of the present invention.

FIG. 2 is a cross-sectional view showing a negative active material, which includes a mixture of a carbonaceous material and a silicon-based composite in accordance with the second embodiment of the present invention. As shown in FIG. 2, the negative active material of the present invention has a structure in which nano-crystalline silicon 12 is dispersed in the amorphous silicon-based composite 11 that includes a silicon oxide of the form $SiO_X$ where $x \leq 1.5$, and at least one element selected from the group consisting of B, P, Li, Ge, Al, and V. The negative active material is mixed with a carbonaceous material 22.

According to a third embodiment of the present invention, the negative active material of the second embodiment is further coated with a carbonaceous material 21.

Figure 3:
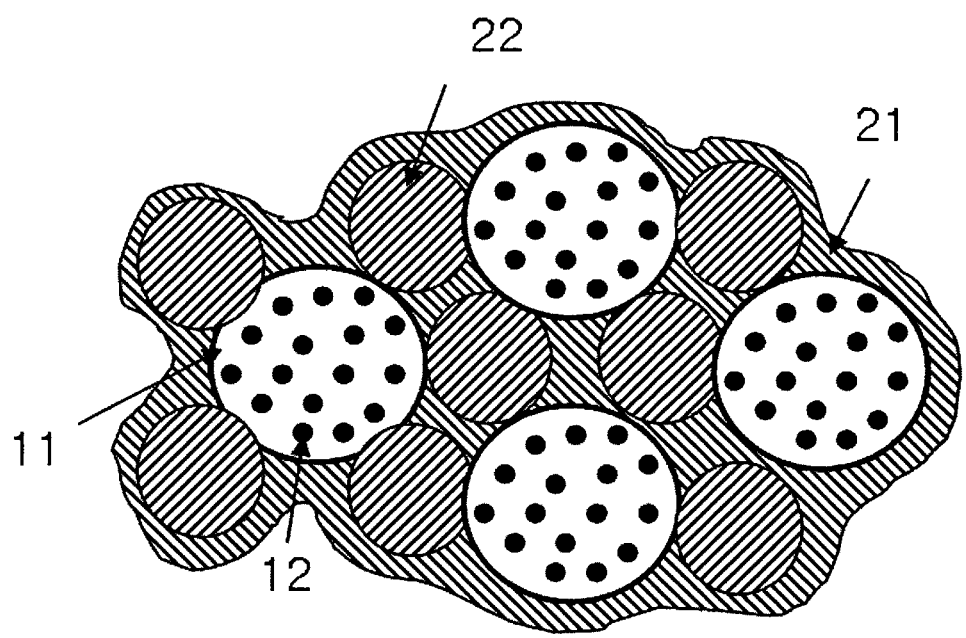
FIG. 3 is a cross-sectional view showing a negative active material with a mixture of a carbonaceous material and a silicon-based composite, which is coated with a carbonaceous material in accordance with a third embodiment of the present invention.

FIG. 3 is a cross-sectional view showing a negative active material of the third embodiment of the present invention. As shown in FIG. 3, the negative active material of the present invention has a structure where nano-crystalline silicon 12 is dispersed in the amorphous silicon-based composite 11 including silicon oxide and at least one element selected from the group consisting of B, P, Li, Ge, Al, and V. The amorphous silicon-based composite 11 is mixed with the carbonaceous material 22 to thereby prepare a mixture, and the surface of the mixture is coated with a carbonaceous material 21.

Generally, silicon oxide has a high irreversible capacity but a short cycle-life and inferior high-rate charge/discharge efficiency. This is because the structural stability and the diffusion rate of Li atoms are low during the charge/discharge.

The technology of the present invention increases the $SiO_X$ amorphization degree and the diffusion rate of Li atoms by introducing at least one element selected from the group consisting of B, P, Li, Ge, Al, and V into silicon oxide.

The amorphization degree of the negative active material according to the present invention is 50% or more, and preferably between 50 and 99%. Furthermore, the diffusion speed of Li atoms of the negative active material is $10^{-8}$ cm$^2$/sec or more, and preferably between $10^{-8}$ and $10^{-6}$ cm$^2$/sec determined according to GITT (Galvanostatic Intermittent Titration Technique).

The amorphization degree is defined by the following Calculation Formula: Amorphization degree (%)=((Main XRD peak intensity of the silicon-based composite after carrying out a quenching treatment)/(Main XRD peak intensity of the silicon-based composite before carrying out the quenching treatment))×100.

According to one embodiment of the invention, it is preferable to control the variable x of $SiO_X$ to be less than or equal to 1.5, and more preferably, to be between 0.5 and 1.5. If x is more than 1.5, the relative amount of Si, which forms an electrochemical reaction site, is too small to induce reduction in the entire energy density.

According to another embodiment, the at least one element selected from the group consisting of B, P, Li, Ge, Al, and V is present at not more than 50 wt % with respect to the total weight of the silicon-based composite, and more preferably, it is between 10 wt % and 30 wt %. If the content of the element exceeds 50 wt %, the energy density and the irreversible capacity may be increased.

In another embodiment, it is preferable that the $SiO_X$ is doped with the at least one element selected from the group consisting of B, P, Li, Ge, Al, and V.

According to another embodiment, the silicon-based composite further includes Si, $SiO_2$, and mixtures thereof, and more preferably, it further includes more Si than any of the other components.

The carbonaceous material coated or mixed with the silicon-based compound may include crystalline carbon or amorphous carbon. The crystalline carbon may include sheet-, spherical-, or fiber-shaped natural graphite or artificial graphite. The amorphous carbon may be any one of graphitizable carbon (soft carbon, sintered carbon at a low temperature), and non-graphitizable carbon (hard carbon). The soft carbon can be obtained by heating a coal pitch, a petroleum pitch, a tar, or a heavy oil having a low molecular weight at 1000° C. The hard carbon can be obtained by heating a phenol resin, a naphthalene resin, a polyvinyl alcohol resin, a urethane resin, a polyimide resin, a furan resin, a cellulose resin, an epoxy resin, or a polystyrene resin at 1000° C. Further, it can be obtained by optional non-deliquescence of a mesophase pitch, raw coke, and a carbonaceous material in which the petroleum, the coal-based carbonaceous material, or the resin-based carbon is heated at between 300 and 600° C., and heating the same at between 600 and 1500° C.

In the negative active materials in accordance with the first to third embodiments, the weight ratio of the silicon-based composite to the carbonaceous material is preferably between 10:90 and 90:10, and more preferably between 30:70 and 70:30. When the content of the carbonaceous material is less than 10 wt %, its function as a supporter against active material volume expansion, which occurs upon charge/discharge, is reduced considerably and thus the cycle-life of the electrode is degraded. And when the content of the carbonaceous material exceeds 90 wt %, the discharge capacity of the active material is decreased due to the reduction in the structural ratio of a silicon-based composite, and thus, attaining an energy density higher than that of conventional graphite negative active material cannot be obtained.

Hereinafter, a method of preparing a silicon-based compound comprising the negative active material according to one embodiment of the present invention is described.

In accordance with the first embodiment of the present invention, the method of preparing a negative active material for a rechargeable lithium battery comprises the steps of: a) mixing at least one chemical compound selected from the group consisting of B-containing compounds, P-containing compounds, Li-containing compounds, Ge-containing compounds, Al-containing compounds, and V-containing compounds, with $SiO_2$ and Si to thereby produce a mixture; b) heat treating the mixture to prepare a silicon-based composite comprising silicon oxide of the form $SiO_X$ where $x \leq 1.5$, and at least one element selected from the group consisting of B, P, Li, Ge, Al, and V; c) quenching the silicon-based composite; and d) coating the silicon-based composite with a carbonaceous material.

In accordance with the second embodiment of the present invention, the method of preparing a negative active material for a rechargeable lithium battery comprises the steps of: a) mixing at least one chemical compound selected from the group consisting of B-containing compounds, P-containing compounds, Li-containing compounds, Ge-containing compounds, Al-containing compounds, and V-containing compounds, with $SiO_2$ and Si to thereby produce a mixture; b) heat treating the mixture to prepare a silicon-based composite comprising silicon oxide of the form $SiO_X$ where $x \leq 1.5$, and at least one element selected from the group consisting of B, P, Li, Ge, Al, and V; and c) mixing the silicon-based composite with a carbonaceous material.

Also, in accordance with a third embodiment of the present invention, a negative active material for a rechargeable lithium battery can be prepared by coating the negative active material of the second embodiment with a carbonaceous material once again. The carbon coating method follows the preparation method of the first embodiment. In preparing the negative active material according to the first to third embodiments, it is preferable that the x of $SiO_X$ is in the range of 0.5 to 1.5.

The following description is applied to all of the first to third embodiments, unless specifically mentioned otherwise.

In one embodiment, it is preferable that $SiO_2$ and Si are mixed in a weight ratio of 3:1 to 1:1.

In one embodiment, it is preferable that the at least one compound selected from the group consisting of B-containing compounds, P-containing compounds, Li-containing compounds, Ge-containing compounds, Al-containing compounds, and V-containing compounds, is a glass network former.

Examples of B-containing compounds include $B_2O_3$, $B_2O$, and combinations thereof. Examples of P-containing compounds include $P_2O_5$, $P_2O_3$, and combinations thereof. Examples of Li-containing compounds include $Li_2O$, $Li_2CO_3$, LiOH, and combinations thereof. One example of a Ge-containing compound is $GeO_2$. One example of an Al-containing compound is $Al_2O_3$. One example of a V-containing compound is $V_2O_5$. In one embodiment, the selected compound is mixed with $SiO_2$ and Si, wherein the content of the selected compound is less than or equal to 50 wt % with respect to the total weight of the mixture, and more preferably, the content of the compound is in the range of 10 wt % to 30 wt %.

Preferably, the heating temperature is between 600 and 1000° C., and more preferably between 800 and 1000° C. When the heating temperature is less than 600° C., it is difficult to provide an amorphous silicon-based composite and a silicon-based composite uniformly due to the deteriorated heat diffusion. Further, when the temperature is more than 1000° C., an undesirable decomposition reaction of Si may occur.

The heating process is preferably carried out under an inert atmosphere or a vacuum atmosphere. According to the above-described process, it is possible to provide a silicon-based composite of a uniform phase comprising a silicon oxide and at least one element selected from the group consisting of B, P, Li, Ge, Al, and V. More preferably, the silicon oxide is doped with the element to improve the amorphorization of the silicon-based composite and the Li diffusion rate.

After the heating process, the compound is quenched to form glass. The quenching process may include, but is not limited to, water-cooling or melt-spinning methods. In the melt-spinning method, the melted material is sprayed via a fine nozzle by a gas at a specific pressure to a metal roll, typically, a Cu-roll, rotating at a high speed and having a surface temperature at room temperature or less. The quenching speed is preferably between $10^2$ and $10^7$ K/sec.

The silicon-based composite comprising silicon oxide of the form $SiO_X$ where $x \leq 1.5$, and at least one element selected from the group consisting of B, P, Li, Ge, Al, and V, is produced by the heating and the quenching processes. The silicon-based composite corresponds to a core material in the negative active material in the first embodiment of the present invention.

When the surface of the silicon-based composite is coated with a carbonaceous material, the negative active material of the first embodiment can be prepared, and if the silicon-based composite is mixed with the carbonaceous material or if the carbonaceous material is adhered to the surface of the silicon-based composite, the negative active material of the second embodiment can be prepared. The negative active material of the third embodiment can be prepared by coating the negative active material of the second embodiment with a carbonaceous material.

In one embodiment, it is preferable that the weight ratio of the silicon-based composite and the carbonaceous material is in the range of 10:90 to 90:10, and more preferably, it is in the range of 30:70 to 70:30.

The carbonaceous material may be crystalline carbon or amorphous carbon. For crystalline carbon, the negative active material of the second embodiment can be prepared by mixing the silicon-based composite with the crystalline carbon in either a liquid or a solid phase. Also, it is possible to prepare the negative active material of the first embodiment or the second embodiment in which the core material is coated with crystalline carbon by performing a coating process after the mixing.

For a solid-phase mixing method, the mixing step may be performed by mechanically mixing the silicon-based composite with crystalline carbon. Mechanical mixing may be accomplished by kneading, or using a mixer having a mixing blade with a modified wing structure compared to a conventional mixing blade, so as to provide sufficient shear stress to the mixture. Alternatively, a mechano-chemical mixing technique may be used where shear is applied to particles in order to cause fusion between particle surfaces.

For a liquid-phase mixing method, the mixing step may be performed either by mechanically mixing the silicon-based composite with crystalline carbon, or by spray-drying, spray-pyrolysis, or freeze-drying. Possible solvents include water, organic solvents, or mixtures thereof. Possible organic solvents include ethanol, isopropyl alcohol, toluene, benzene, hexane, tetrahydrofuran, and the like.

Further, where the negative active material of the second embodiment or the third embodiment is prepared by adhering the carbonaceous material to the surface of the silicon-based composite, it is possible to add coal tar pitch, petroleum pitch, tar, or an intermediate oil having a low molecular weight, or resins including phenol resin, naphthalene resin, polyvinyl alcohol, urethane resin, polyimide resin, furan resin, cellulose resin, epoxy resin, or polystyrene resin, in order to improve the adhesion between the carbonaceous material and the silicon-based composite. If necessary, an amorphous carbon film can be formed by adding the coal tar pitch, petroleum pitch, tar, or intermediate oil having a low molecular weight, and resins including phenol resin, naphthalene resin, polyvinyl alcohol, urethane resin, polyimide resin, furan resin, cellulose resin, epoxy resin, and polystyrene resin, and carbonizing the mixture at a temperature between 800 and 1,000° C.

The negative active material of the first or third embodiment can be formed by heat-treating the mixture of the silicon-based composite coated with the carbon material precursor. The coating process may be performed using a dry or wet method. Additionally a deposition method such as chemical vapor deposition (CVD) may be performed using a carbon-containing gas such as methane, ethane or propane. For the carbon material precursor used for coating the carbonaceous material over the core, at least one material selected from the group consisting of various resins such as phenolic resin, naphthalene resin, polyvinylalcohol resin, urethane resin, polyimide resin, furan resin, cellulose resin, epoxy resin, and polystyrene resin; coal-based pitch; petroleum-based pitch; tar; or heavy oil with a low molecular weight, may be used. However, it is understood that the carbon material precursor in the present invention is not limited thereto.

A rechargeable lithium battery according to one embodiment of the present invention comprises a negative electrode composed of the negative active material described above. The negative electrode is prepared by mixing the negative active material with a binder to provide a negative electrode mass, and coating the same on a current collector of copper. If necessary, a conductive agent can be added.

The conductive agent may include, but is not limited to, nickel powder, cobalt oxide, titanium dioxide, or carbon. The carbon for the conductive agent may include ketjen black, acetylene black, furnace black, graphite, carbon fiber, or fullerene, and is preferably graphite which performs as a conductive agent and a frame for an electrode.

Figure 4:
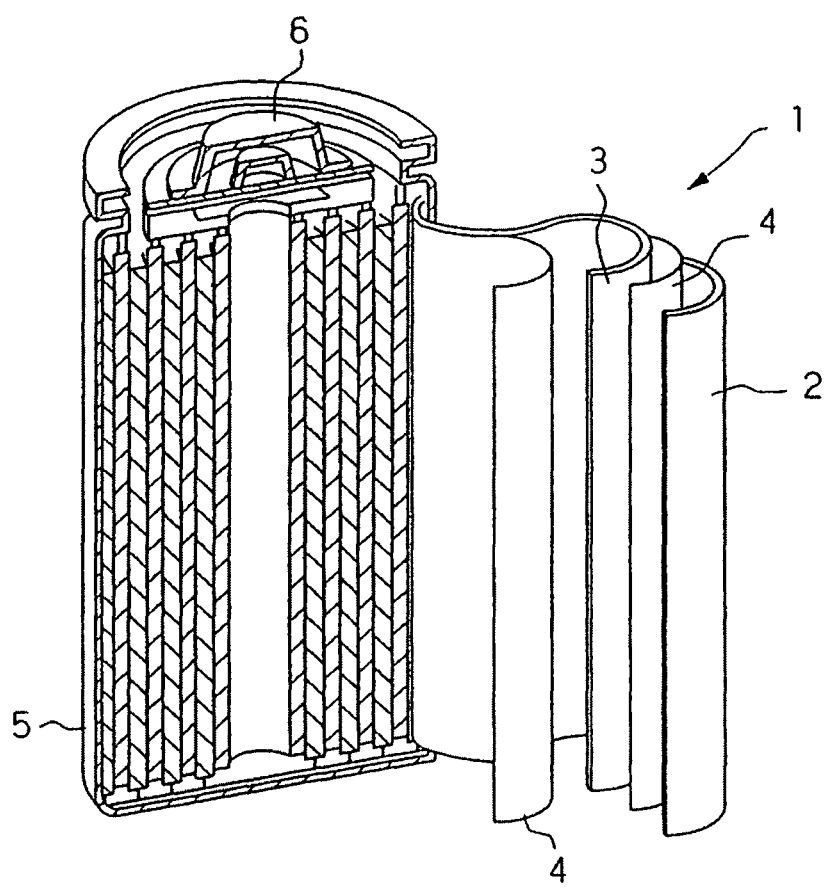
FIG. 4 is a perspective view showing one embodiment of a rechargeable lithium battery according to the present invention.

FIG. 4 shows a rechargeable lithium battery 1 according to an embodiment of the present invention. The rechargeable lithium battery 1 includes a negative electrode 2, a positive electrode 3, and a separator 4 interposed between the positive electrode 3 and the negative electrode 2, all of which are placed in a cell housing 5 filled with electrolyte and sealed with a sealing member 6. Even though the rechargeable lithium battery shown in FIG. 1 is formed in a cylindrical shape, it may be formed into various shapes such as a prismatic, a coin, or a sheet shape.

The positive electrode may be constructed of a positive electrode mixture comprising a positive active material, a conductive agent, and a binder. Suitable positive active materials include compounds capable of reversibly intercalating/deintercalating lithium ions such as $LiMn_2O_4$, $LiCoO_2$, $LiNiO_2$, $LiFeO_2$, $V_2O_5$, TiS, or MoS. Suitable materials for the separator include olefin-based porous films such as polyethylene or polypropylene.

Suitable electrolytes include lithium salts dissolved in a solvent. Suitable solvents include propylene carbonate, ethylene carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetoamide, dimethylsulfoxide, dioxane, 1,2-dimethoxyethane, sulforane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethylether, and the like. Suitable lithium salts include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_aF_{2a+1}SO_2)(C_bF_{2b+1}SO_2)$ (where a and b are natural numbers), LiCl, LiI, and the like.

Furthermore, instead of a liquid electrolyte as set forth above, a solid polymer electrolyte may be used. It is preferred that if a polymer electrolyte is used, it should employ a polymer having ion-conductivity to lithium ions, and examples include polyethylene oxide, polypropylene oxide, and polyethyleneimine. The electrolyte may also be in a gel state such that the solvent and the solute are added to the polymer.

The following examples further illustrate the present invention in detail, but are not to be construed to limit the scope thereof.

EXAMPLE 1

A mixture was prepared by adding 20 parts by weight of $B_2O_3$ to 100 parts by weight of a mixture of $SiO_2$ and Si, which was obtained by mixing $SiO_2$ and Si in a molar ratio of 1:1. Then, a silicon-based composite with $SiO_X$ (where x=1.48) doped with 6.2 wt % B was prepared by heat treating the mixture at 800° C. under a vacuum and quenching the mixture at a rate of $10^3$K/sec. Subsequently, the negative active material of the first embodiment was prepared by using the silicon-based composite as a core material and coating it with 30 wt % of an amorphous carbonaceous material using a Chemical Vapor Deposition (CVD) method.

COMPARATIVE EXAMPLE 1

A Si composite negative active material coated with carbon was prepared by coating the surface of Si powder having a particle size of 5 μm with an amorphous carbonaceous material using the CVD method.

COMPARATIVE EXAMPLE 2

$SiO_X$ (where x=1) was prepared by heat treating a mixture of $SiO_2$ and Si at 800° C. and quenching it at a rate of $10^3$K/sec. The mixture of $SiO_2$ and Si was obtained by mixing $SiO_2$ and Si in a molar ratio of 1:1. Subsequently, a silicon oxide composite negative active material coated with carbon was prepared by using the silicon oxide as a core material and coating it with 30 wt % of an amorphous carbonaceous material using the CVD method.

COMPARATIVE EXAMPLE 3

A mixture was prepared by adding 20 parts by weight of $B_2O_3$ to 100 parts by weight of a mixture of $SiO_2$ and Si, which was obtained by mixing $SiO_2$ and Si in a molar ratio of 3:1. Then, a silicon-based composite with $SiO_X$ (where x=1.95) doped with 5.2 wt % B was prepared by heat treating the mixture at 800° C. under a vacuum and quenching the mixture at a rate of $10^3$K/sec. Subsequently, a negative active material was prepared by using the silicon-based composite as a core material and coating it with 30 wt % of an amorphous carbonaceous material using the CVD method.

EXAMPLE 2

A mixture was prepared by adding 20 parts by weight of $B_2O_3$ to 100 parts by weight of a mixture of $SiO_2$ and Si, which was obtained by mixing $SiO_2$ and Si in a molar ratio of 1:1. Then, a silicon-based composite with $SiO_X$ (where x=1.48) doped with 6.2 wt % B was prepared by heat treating the mixture at 800° C. under a vacuum and quenching the mixture at a rate of $10^3$K/sec. Subsequently, a negative active material was prepared by mixing the silicon-based composite and graphite in a weight ratio of 7:3.

COMPARATIVE EXAMPLE 4

A negative active material was prepared by mixing Si powder having a particle size of 5 μm and graphite in a weight ratio of 7:3.

COMPARATIVE EXAMPLE 5

$SiO_X$ (where x=1) was prepared by heat treating a mixture of $SiO_2$ and Si under a vacuum. The mixture of $SiO_2$ and Si was obtained by mixing $SiO_2$ and Si in a molar ratio of 1:1 at 800° C. and quenching it at a rate of $10^3$K/sec. Then, a Si composite negative active material was prepared by mixing the SiO and graphite in a weight ratio of 7:3.

Preparation of Charge/Discharge Test Cells

The negative active materials according to Examples 1 to 2 and Comparative Examples 1 to 5 were mixed with polyvinylidene fluoride in a weight ratio of 90:10 in N-methylpyrrolidone to provide a negative electrode slurry solution. Each slurry solution including the negative active materials prepared in accordance with Example 1 and Comparative Examples 1 to 3 was applied with a doctor blade to a copper foil having a thickness of 10 μm, and dried in a vacuum atmosphere at 100° C. for one hour to evaporate the N-methylpyrrolidone. For each, a negative active mass having a thickness of 50 μm was thereby deposited on the copper foil, which was then cut to form a circle with a diameter of 16 mm to thereby provide a negative electrode.

Also, each slurry solution including the negative active materials prepared in accordance with Example 2 and Comparative Examples 4 and 5 was applied with a doctor blade to a copper foil having a thickness of 18 μm and dried in a vacuum atmosphere at 100° C. for 24 hours to evaporate the N-methylpyrrolidone. For each, a Cu current collector with 120 μm of a negative active material deposited thereon was acquired. Subsequently, negative electrodes were prepared by cutting the Cu current collector in a circular shape having a diameter of 13 mm.

In addition to the negative electrode, lithium foil was punched in a circle shape having the same diameter as the negative electrode to provide a counter electrode, and a separator composed of a porous polypropylene film was inserted between the negative electrode and the counter electrode to provide a coin-type test cell. For the electrolyte, 1 mol/L of $LiPF_6$ solution was dissolved in a mixed solvent of diethyl carbonate (DEC), and ethylene carbonate (EC) at a volume ratio of DEC:EC of 1:1.

Subsequently, charge and discharge tests were performed for the negative active materials according to Example 1 and Comparative Examples 1 to 3 under the conditions of a 0.2C charge and discharge rate, a cut-off charge voltage of 0 V (Li/Li$^+$), and cut-off discharge voltage of 2.0 V (Li/Li$^+$).

Also, charge and discharge tests were performed for the negative active materials according to Example 2 and Comparative Examples 4 and 5 under the conditions of a 0.2C charge and discharge rate, a cut-off charge voltage of 0 V (Li/Li$^+$), and cut-off discharge voltage of 2.0 V (Li/Li$^+$).

Table 1 shows the composition of alloy and amorphization of the negative active materials prepared in Examples 1 and 2 and Comparative Examples 1 to 5, and the discharge capacity, initial efficiency, and cycle-life of electrodes of the cells prepared by using the negative active materials.

TABLE 1

|  | Composition of Alloy | Discharge Capacity (mAh/g) | Initial Efficiency (%) | Cycle-life of Electrode (% at 100th cycle) | Amorphization (%) |
|---|---|---|---|---|---|
| Example 1 | $SiO_X$ (x = 1.48) Doped with B and Coated with Carbon | 700 | 88 | >90 | 80 |
| Comparative Example 1 | Si Coated with Carbon | 1200 | 90 | <40 | 0 |
| Comparative Example 2 | $SiO_X$ (x = 1) Coated with Carbon | 850 | 78 | <70 | 50 |

TABLE 1-continued

|  | Composition of Alloy | Discharge Capacity (mAh/g) | Initial Efficiency (%) | Cycle-life of Electrode (% at 100th cycle) | Amorphorization (%) |
|---|---|---|---|---|---|
| Comparative Example 3 | SiO$_x$ (x = 1.95) Doped with B and Coated with Carbon | 420 | 70 | ~75 | 70 |
| Example 2 | SiO$_x$ (x = 1.48) Doped with B and Mixed with Graphite | 600 | 85 | >80 | 80 |
| Comparative Example 4 | Si Mixed with Graphite | 800 | 50 | <30 | 0 |
| Comparative Example 5 | SiO$_x$ (x = 1) Mixed with Graphite | 700 | 65 | <70 | 50 |

It can be seen from Table 1 that the rechargeable lithium cells including the negative active material prepared in accordance with Examples 1 and 2 have a high amorphization degree and a long cycle-life of more than 80%.

As described above, the negative active material for a rechargeable lithium battery of the present invention heightens the amorphization degree and improves the diffusion rate of Li atoms by mixing a silicon oxide with at least one element selected from the group consisting of B, P, Li, Ge, Al, and V. Therefore, it can greatly improve the cycle-life of the rechargeable lithium battery and the high-rate charge/discharge characteristics.

The present invention has been described in detail with reference to certain preferred embodiments. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A negative active material for a rechargeable lithium battery, comprising:
   a silicon-based composite core of a uniform phase comprising: a silicon oxide of the form SiO$_x$ where x≤1.5, and one or more elements selected from the group consisting of B, P, Al, and V, wherein the one or more elements are included in a range of 6.2 wt% to 50 wt % based on the total weight of the silicon-based composite core; and
   a carbonaceous material coating layer on the surface of the silicon-based composite core.

2. The negative active material according to claim 1, where x is between 0.5 and 1.5.

3. The negative active material according to claim 1, wherein the one or more elements selected from the group consisting of B, P, Al, and V are provided in an amount from 10 wt % to 30 wt % with respect to the total weight of the silicon-based composite core.

4. The negative active material according to claim 1, wherein the silicon oxide is doped with the one or more elements selected from the group consisting of B, P, Al, and V.

5. The negative active material according to claim 1, wherein the carbonaceous material is crystalline carbon or amorphous carbon.

6. The negative active material according to claim 1, wherein the silicon-based composite core further comprises Si, SiO$_2$, or mixtures thereof.

7. The negative active material according to claim 1, wherein the silicon-based composite core and the carbonaceous material are provided in a weight ratio between 10:90 and 90:10.

8. The negative active material according to claim 1, wherein the silicon-based composite core and the carbonaceous material are provided in a weight ratio between 30:70 and 70:30.

9. The negative active material according to claim 1, wherein the negative active material has an amorphization degree of over 50% and the amorphization degree is calculated based on an X-ray diffraction peak by the following Calculation Formula:

Amorphization degree (%)=((Main XRD peak intensity of the silicon-based composite core after carrying out a quenching treatment)/(Main XRD peak intensity of the silicon-based composite core before carrying out the quenching treatment))×100.

10. The negative active material according to claim 1, wherein the negative active material has a Li diffusion rate of over $10^{-8}$ cm$^2$/sec based on a Galvanostatic Intermittent Titration Technique (GITT) method.

11. A rechargeable lithium battery, comprising:
   a negative electrode including a negative active material comprising a carbonaceous material coating layer and a silicon-based composite core of a uniform phase comprising: a silicon oxide of the form SiO$_x$ where x≤1.5 and one or more elements selected from the group consisting of B, P, Al, and V, wherein the one or more elements are included in a range of 6.2 wt% to 50 wt % based on the total weight of the silicon-based composite core, wherein the carbonaceous material coating layer is on the surface of the silicon-based composite core;
   a positive electrode including a positive active material capable of reversibly intercalating/deintercalating lithium; and
   an electrolyte.

* * * * *